United States Patent [19]

Beaulier

[11] 4,075,656
[45] Feb. 21, 1978

[54] CIRCUIT FOR DIGITALLY ENCODING AN ANALOG TELEVISION SIGNAL

[75] Inventor: Daniel A. Beaulier, Menlo Park, Calif.

[73] Assignee: Ampex Corporation, Redwood City, Calif.

[21] Appl. No.: 762,901

[22] Filed: Jan. 26, 1977

[51] Int. Cl.² .................... H04N 7/04; H04N 9/32
[52] U.S. Cl. .................................... 358/13; 358/141
[58] Field of Search .................................. 358/13, 141

[56] References Cited

U.S. PATENT DOCUMENTS 3,946,432  3/1976  Goldberg et al. ................ 358/13

Primary Examiner—John C. Martin
Attorney, Agent, or Firm—Elizabeth E. Strnad

[57] ABSTRACT

A circuit for digitally encoding an analog television signal by sampling is provided. The circuit includes an analog-to-digital encoder which receives both the analog television signal and a sampling signal generated by the circuit. A clock signal generator is utilized providing a signal of a frequency equal to a first integral multiple of a desired sampling signal frequency and to a second integral multiple of the frequency of a synchronizing component of the television signal. The clock signal is phase-locked to that synchronizing component. A frequency divider is utilized to divide the frequency of the clock signal to provide a sampling signal of a desired frequency. The resulting sampling signal frequency is a non-integral rational multiple of the horizontal sync frequency. The frequency divider is set during each horizontal blanking period to a predetermined state to provide a sampling signal whose phase is the same at the beginning of each horizontal line of the analog television signal. Vertical alignment of sampling signals on subsequent horizontal lines of the television signal results.

10 Claims, 5 Drawing Figures

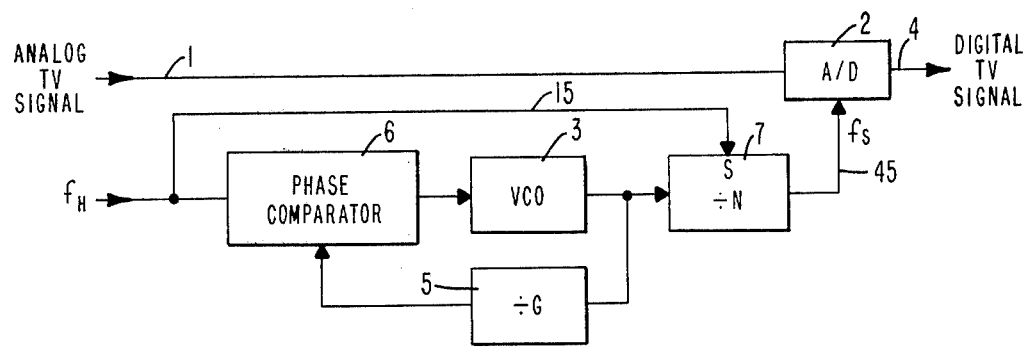
Fig_1
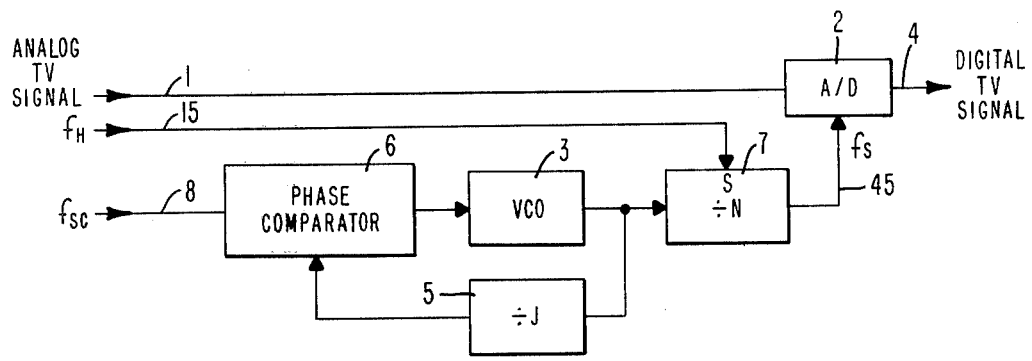
Fig_2
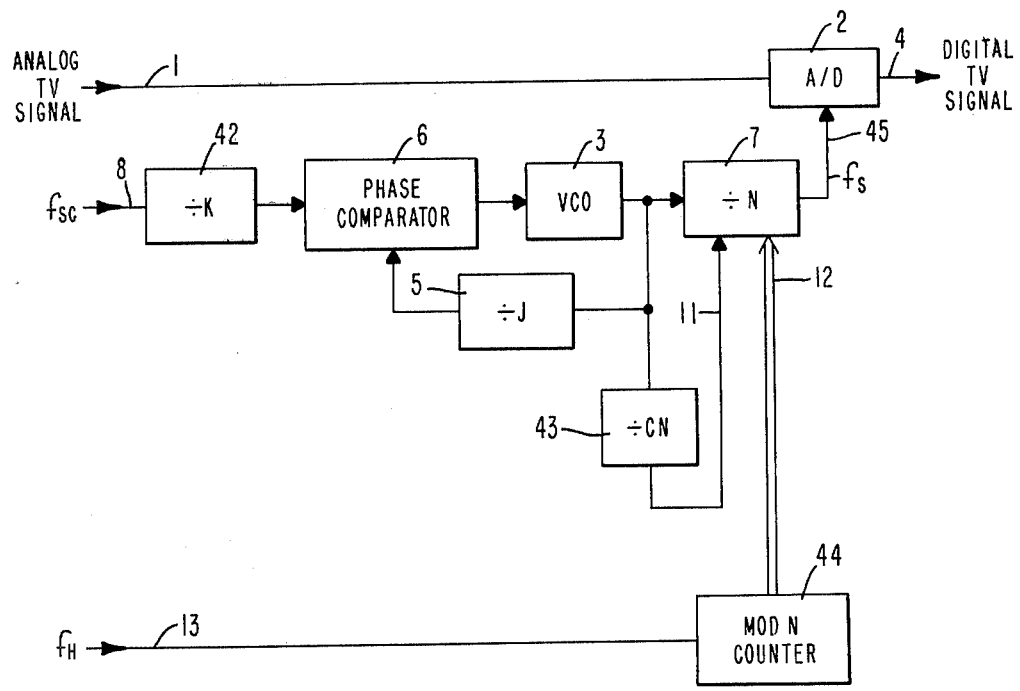
Fig_3

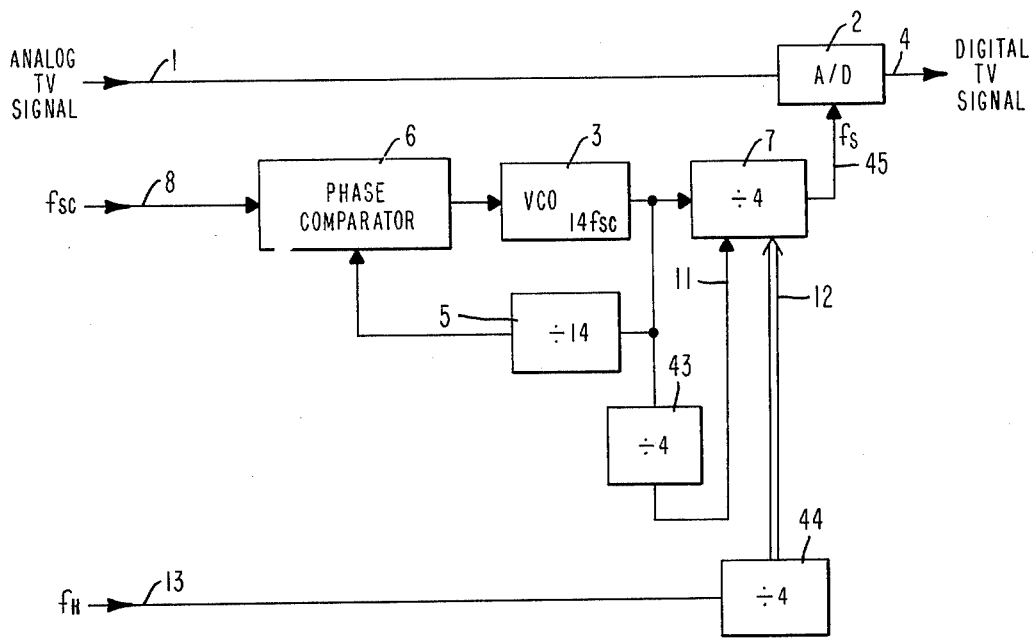
FIG_4
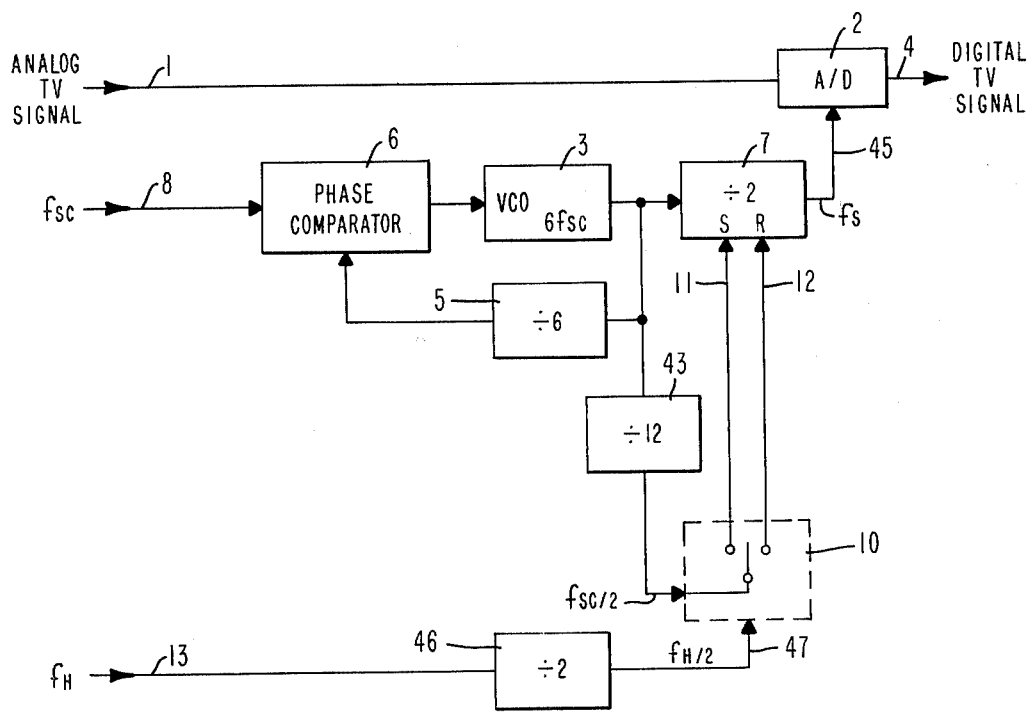
FIG_5

CIRCUIT FOR DIGITALLY ENCODING AN ANALOG TELEVISION SIGNAL

BACKGROUND OF THE INVENTION

The invention relates to a system for digital encoding of analog television signals utilizing discrete sampling signals.

In television signal processing it is often desirable to separate various signal components from each other, such as for image enhancing or color signal processing.

For example, where it is necessary to separate the luminance and the chrominance signals of a composite color television signal such as for recording, it is important to avoid penetration of any portion of the luminance signal into the chrominance signal. If a remaining small portion of the luminance signal is processed together with the chrominance signal, a disturbing flicker is generated which will appear in the reconstructed television picture. A preferable technique which yields a desirable clean signal separation is so-called comb filtering, which is well known in the art. One way of utilizing the comb filtering technique is to selectively add and subtract picture elements of three adjacent color television lines in a given field, to obtain the chrominance and luminance signals. This particular technique is performed by sampling and forming a weighted average of three vertically aligned picture elements from three adjacent horizontal lines of the television field raster and it is repeated for all picture elements. The comb-filtering technique is particularly advantageous for digitally encoded color television signals such as by pulse code modulation (PCM) where each individual code corresponds to a particular amplitude value of the analog signal at a particular sampling time. There are known techniques for digitally encoding color television signals at a sampling frequency which is an even or odd multiple of the NTSC color subcarrier frequency in preparation for subsequent comb filtering. When the sampling frequency is, for example, an even multiple of the NTSC subcarrier frequency, the samples on subsequent lines utilized for PCM encoding are separated by exactly one horizontal line period and thus they are vertically aligned on the television raster. However, if an odd multiple of the subcarrier frequency is utilized as the sampling signal frequency, only the samples on alternate horizontal lines are vertically aligned whereas the samples on adjacent lines are misaligned with respect to each other by one-half sample period due to the well known relationship between the subcarrier and horizontal line frequency of NTSC signals. This relationship is defined as the color subcarrier frequency, $f_{SC}$, being an odd multiple of one-half horizontal line frequency, $f_H$, and is given by the equation $f_{SC} = 455/2 \, f_H$. Therefore, if comb filtering is to be utilized for signals sampled at an odd multiple of subcarrier frequency, it is necessary to provide additional means to produce vertical alignment of sampling signals on all horizontal lines of the television field raster. One way of solving this particular problem is described for example in a prior art U.S. Pat. No. 3,946,432 to Goldberg et al. where sampling signals of three-times the NTSC color subcarrier frequency are generated and inverted for alternate lines. The non-inverted and inverted sampling signals are used during alternate lines as a clock signal for sampling the analog color television signal for digital encoding thereof. The result is that the television signal is sampled line by line at vertically aligned points of the television raster. However, the above-mentioned prior art encoding technique has disadvantages which will be discussed below.

When encoding an analog color television signal into discrete signal levels at high operating speeds, it is essential that vertical alignment of samples be maintained within very close tolerances of approximately 1 to 2 nanoseconds over a period of at least three consecutive lines to prevent hue errors and ensure effective comb filtering. By generating two oppositely phased square wave sampling signals, such as in the above-indicated patent, it is difficult to achieve alignment of the corresponding transitions of these signals within the required close tolerances, and thus generate sampling signals at accurate equidistant sampling intervals. For example, when utilizing ordinary digital logic components, there is an inherent variation between rise and fall times of the generated square wave. When such a square wave is inverted, the rise and fall times thereof may differ from those of the non-inverted form of the signal, thus introducing relative asymmetry between the two signals. Furthermore, when considering that for generation of oppositely phased sampling signals two separate signal channels are utilized, it is apparent that there will be timing errors introduced by the differences in signal propagation through the respective channels due to different time delays effected by variations in the circuit components utilized in the respective channels. To improve the vertical alignment of the respective samples formed by the inverted and non-inverted sampling signals it is necessary for the waveform applied to the signal inverter of the prior art encoder to have an extremely low even order harmonic content, otherwise the previously mentioned asymmetry between the non-inverted and inverted waveforms occurs. To compensate for such problem would complicate the apparatus and increase its cost. Furthermore, there will be a difference in noise pickup in the respective inverted and non-inverted signal channels thus contributing additional signal asymmetry.

There is still an additional significant disadvantage of the above-mentioned prior art color television signal encoding technique in that only a sampling signal frequency which is an integral multiple of the subcarrier frequency may be utilized for signal encoding by that technique. Thus, for encoding of other than NTSC television signals where the frequency relationship between the color subcarrier and horizontal line frequency is different and somewhat more complicated than in NTSC, such as in PAL and other systems, the above-mentioned prior art technique is not applicable. It is an object of the present invention to provide a circuit for digital encoding of television signals which overcomes the above-described and other disadvantages of the prior art systems.

SUMMARY OF THE INVENTION

Accordingly, it is an object of the present invention to provide a circuit for digitally encoding an analog television signal that generates a sampling signal having a frequency equal to a non-integral rational multiple of the horizontal sync frequency of said television signal and having sampling pulses vertically aligned on subsequent horizontal lines of the television raster.

It is a further object of the invention to provide a circuit utilizing the same circuit elements for deriving sampling signals from higher frequency clock signals for sampling an analog television signal during consecutive horizontal lines thereof.

It is a further object of the invention to provide a circuit for digitally encoding an analog television signal comprising a generator providing clock signals having a frequency equal to both an integral multiple of a frequency of a synchronizing component of the television signal and an integral multiple of the desired sampling signal frequency.

It is still a further object of the present invention to provide a circuit producing vertically aligned samples with respect to the television raster derived from a sampling signal whose second harmonic content and thereby square waveform symmetry is not critical.

It is still another object of the present invention to provide a circuit for generating a sampling signal for digital encoding of an analog color NTSC television signal which sampling signal does not need to have a frequency equal to an integral multiple of the color subcarrier signal frequency.

It is a further object of the present invention to provide a circuit generating a sampling signal, derived from a clock signal, having vertically aligned pulses with respect to the television raster which circuit does not provide inversion of the clock signal or of the sampling signal.

It is still a further object of the invention to provide a circuit for digitally encoding NTSC or PAL analog television signals by sampling which circuit produces sampling signals having a frequency equal to a non-integral rational multiple of the horizontal sync and being vertically aligned within 1 to 2 nanoseconds over a period of at least three consecutive horizontal lines.

The foregoing and other objects are accomplished by a circuit of the present invention for digitally encoding an analog television signal by sampling. The circuit in accordance with the invention comprises means for generating a clock signal having a frequency equal to a first integral multiple of a desired sampling signal frequency and a second integral multiple of a frequency of a synchronizing component of the analog television signal. Means for phase-locking the clock signal to that synchronizing component are provided. The desired sampling signal frequency is a non-integral rational multiple of the horizontal sync frequency. Means for dividing the frequency of the clock signal by the first integral multiple is provided for forming a sampling signal of the desired frequency. The frequency dividing means is presettable during each horizontal blanking period to provide a sampling signal whose phase is the same at the beginning of each horizontal line of the analog television signal. An analog-to-digital converter is coupled to receive the sampling signal and provide sampling and subsequent digital encoding of an analog television signal.

BRIEF DESCRIPTION OF THE DRAWINGS

FIG. 1 is a block diagram of a circuit for digital encoding an analog television signal in accordance with a preferred embodiment of the invention;

FIGS. 2 to 5 are respective block diagrams of further preferred embodiments of the invention.

DESCRIPTION OF THE PREFERRED EMBODIMENTS

FIG. 1 shows a circuit for digitally encoding an analog television signal in accordance with a preferred embodiment of the invention. An incoming analog television signal to be encoded is received on line 1 and it is fed to an analog/digital encoder 2 for encoding into a digital signal suitable for comb filtering. It has been explained above that for comb filtering a digitally encoded television signal, it is necessary to provide vertical alignment of the sampling signal pulses applied to subsequent horizontal lines of the analog television signal. This is achieved by the circuit of FIG. 1 of the present invention, the description of which follows. A clock signal generator 3 is employed providing a signal of a suitable frequency equal to an integral multiple G of the horizontal sync frequency $f_H$ and at the same time an integral multiple N of a desired sampling signal frequency $f_S$. For this purpose, a voltage controlled oscillator (VCO) 3 is provided which generates a signal having a frequency $G \times f_H = N \times f_S$, $f_H$ being the horizontal sync frequency of the particular television system utilized (such as 15.75 kHz for NTSC 15.625 kHz for PAL, etc.), $f_S$ being the sampling signal frequency, G and N being integral numbers. Preferably, the VCO frequency is selected as the least common multiple of $f_H$ and $f_S$ for the obvious advantage of lower clock signal frequency and thus circuit simplification. A conventional phase-lock loop is utilized to phase-lock the output signal of the VCO 3 to the horizontal sync pulse on line 15. The horizontal sync may be obtained from the incoming television signal on line 1 by utilizing a conventional horizontal sync separator (not shown) or it may be obtained from a station sync generator in a well-known manner. The phase-lock loop comprises VCO 3, a frequency divider by G designated by reference numeral 5 and a phase comparator 6. The phase comparator 6 compares the horizontal sync on line 15 and the output signal of the frequency divider 5 and generates an error signal. The error signal from phase comparator 6 is in turn applied to VCO 3 to correct any deviation from the desired output signal frequency thereof. The output signal of the VCO 3 is the above-mentioned clock signal and it is applied to a frequency divider by N designated by reference numeral 7. The frequency divider 7 provides a sampling signal on line 45 having a desired frequency $f_S$ to be utilized for digital encoding of the incoming analog color television signal on line 1. The frequency of the sampling signal at output of divider 7 on line 45 is a non-integral rational multiple of the horizontal sync frequency and may be expressed as $f_S = G/N \times f_H = (I + M/N) \times f_H$ where G, N, I, M are integers and M<N. Thus, $I \times f_H$ represents an integral multiple and $(M/N) \times f_H$ a fraction of the horizontal line frequency $f_H$. To assure vertical alignment of the sampling signal waveform and thus of the samples applied to subsequent television lines within the required close tolerances of approximately 1 to 2 nanoseconds over a period of at least three consecutive lines as previously mentioned, the phase of the output signal of the frequency divider is repositioned in response to a control signal on line 15 at a horizontal line rate $f_H$ during the horizontal blanking interval by a time interval corresponding to the above-indicated fraction of frequency $(M/N \times f_H)$. The repositioning is performed, for example, by setting a counter utilized as the frequency divider 7 to a specific predetermined state in response to a transition of the above-mentioned control signal as it will be described later in more detail. Frequency dividers which can be preset to a given state in response to a set signal are well known in the art and are commercially available. Such a frequency divider may be implemented by a number of flip-flops providing a counter which produces a pulse at its output after receiving N input pulses provided by the VCO 3. Whenever a preset pulse on line 15 is received by the counter, all flip-flops are forced to a known state independent of their state prior to the set pulse. The resetting action reinitializes the counting sequency at the same point on each line, with the result that the sampling signal waveform at the output of the frequency divider 7 is identical line-to-line thus yielding vertically aligned sampling pulses on subsequent horizontal lines of the television raster. The vertically aligned sampling pulses are then applied from the output of divider 7 to the analog-to-digital encoder 2 and utilized for sampling and subsequent digital encoding of the incoming analog signal on line 1 in a well-known manner. The encoder 2 shown as a single block in FIG. 1 provides sampling, encoding and quanitizing of the analog television signal. When the incoming analog signal is a NTSC color signal, the analog-to-digital encoding may be performed by any conventional technique, for example, by pulse code modulation (PCM). However, the utilization of the circuit of the invention is by no means limited to digital encoding of NTSC signals. To the contrary, the circuit of the invention may be utilized for digitally encoding monochrome as well as color television signals by generating sampling signals of any desired frequency expressed as $f_S = (1 + M/N) \times f_H$ while providing a sampling signal waveform whose pulses are vertically aligned on subsequent horizontal lines of the television raster.

In illustration of the above described embodiment utilization of the circuit of FIG. 1 for digitally encoding an NTSC analog color television signal will be now described. For this purpose, a sampling signal of approximately 10.7 MHz is generated by the circuit. It is noted that this particular frequency corresponds to three times the NTSC color subcarrier signal frequency of approximately 3.58 MHz. In this particular example, the values of G and N are selected G=1365 and N=2. Thus, the frequency of the clock signals generated by the VCO 3 in the circuit of FIG. 1 is $f_{VCO} = 1365 \times f_H \approx 1365 \times 15.75$ KHz $\approx 21.49$ MHz. It will be noted that the clock signal frequency also corresponds approximately to 6 times the NTSC subcarrier frequency of 3.58 MHz. However, the latter frequency relationship is rather coincidental and it is not a necessary condition for proper operation of the preferred embodiment shown in FIG. 1 as it will become apparent from the description below. Thus, the output signal frequency of VCO 3 is divided by 1365 in the frequency divider 5 to obtain the horizontal line frequency $f_H$ which is then applied to the phase comparator 6 for comparison with the horizontal sync signal on line 15 as previously described with respect to the operation of the circuit of FIG. 1. The other frequency divider 7 divides the output signal frequency of the VCO 3 by 2, thus providing the desired sampling signal frequency of 10.7 MHz, which frequency also can be expressed as $f_S = (G/N) \times f_H = (1365/2) \times 15.75$ KHz $\approx 10.7$ MHz. The frequency divider 7 is set during each horizontal blanking period by a transition of the horizontal sync to the same predetermined state to provide vertical alignment of samples on subsequent horizontal lines as it has been previously described with respect to the operation of the circuit of FIG. 1.

It is apparent from the foregoing description that in the encoding circuit of the present invention for achieving a desired vertical alignment of samples on subsequent horizontal lines, it is not necessary to provide inversion of the clock or sampling signals and to apply alternately the non-inverted and inverted signals on subsequent television lines via two separate signal channels to the encoder as it is the case in the prior art encoding circuits. Instead, the encoding circuit of the present invention obtains vertically aligned samples for example, by setting a counter utilized as a frequency divider to a predetermined state during the horizontal blanking period. The circuit of the invention provides a significant improvement over the prior art technique by utilizing a single sampling signal waveform on subsequent horizontal lines instead of the two separate inverted and non-inverted waveforms of the prior art circuit. By simply setting the sampling waveform in time instead of inverting it, the timing error originating in inaccurate vertical alignment of the respective rise and fall times of corresponding inverted and non-inverted square waves is eliminated. Also, the problem of utilizing different channels for the respective signal waveforms applied to alternate horizontal lines of the analog television signal is eliminated and thus the differences in signal delays and noise pickup causing assymetry are removed. With respect to the fact that the sampling signal waveform is not a perfect square wave, it contains both even and odd harmonics. If, for example, it is desired to provide a time delay of the sampling signal by 180° by the encoding circuit of the invention, only sidebands on the odd harmonics will be produced by changing the odd harmonics by odd multiples of 180°. However, the even harmonics will be changed by even multiples of 180°, that is, by multiples of 360°, that is, they stay unchanged and no modulation on even harmonics results. When the sampling signal is inverted, as in prior art encoders, modulation of both odd and even harmonics occurs intrinsically, thus causing unwanted distortion.

A further important distinction and advantage of the encoding circuit according to the invention with respect to the prior art circuits will become apparent from the description below. As mentioned before, the circuit of the invention is capable of producing a sampling signal of any desirable frequency which is a non-integral rational multiple of the horizontal sync frequency while yielding a vertical alignment of samples. Referring now to the preferred embodiment of FIG. 1, a further example will be described where the sampling signal frequency utilized for digital encoding of the analog television signal is a 3.5 multiple of the NTSC subcarrier signal frequency, that is, $f_S = 3.5 \times 3.58$ MHz $\approx 12.5$ MHz. As mentioned before, vertical alignment of sampling pulses derived from a sampling signal having a frequency other than equal to an integral multiple of the NTSC color subcarrier frequency could not be achieved by the known prior art circuits. In this example, in the circuit of FIG. 1, G and N are selected as G = 3185 and N = 4. Thus, the frequency of the clock signal produced by VCO 3 is $G \times f_H = 3185 \times 15.75$ kHz $\approx 50$ MHz, and of the sampling signal produced by the first frequency divider 7 on line 45 is $f_S = 50$ MHz $\div 4 = 12.5$ MHz, the latter frequency corresponding to the desired 3.5 multiple of the NTSC color subcarrier frequency. As previously described with respect to the operation of the circuit of FIG. 1, the first frequency divider 7 is set during the horizontal blanking period to a predetermined state to assure a perfect vertical alignment of samples. The ability of generating a sampling signal having a frequency of any non-integral rational multiple of the horizontal line frequency and at the same time suitable for comb filtering is of particular importance for use in television systems other than NTSC, such as PAL, etc., for preparation of color or monochrome television signals for subsequent comb filtering.

To further illustrate utilization of the preferred embodiment of the invention shown in FIG. 1 for encoding of PAL signals with sampling signals having a frequency equal to 13/5 of the subcarrier frequency, the following example is given: G = 2951 and N = 4. Thus, the frequency of VCO 3 is $G \times f_H$ = 2951 × 15.625 kHz ≈ 46.11 MHz. Consequently, the sampling signal frequency is $f_S$ ≈ 46.11 ÷ 4 ≈ 11.53 MHz. As it follows from the foregoing, the sampling signal frequency can be expressed as $f_S = 13/5 f_{SC} = 2951/4 f_H = 737\frac{3}{4} f_H$; thus when comparing with the foregoing description of the circuit of FIG. 1 we obtain: $I$ = 737; $M$ = 3; $N$ = 4; and it is seen that the sampling signal frequency is indeed a non-integral rational multiple of the horizontal sync frequency.

Another preferred embodiment of the invention is shown in the block diagram of FIG. 2 suitable for encoding NTSC signals. The circuit of FIG. 2 is similar to that shown in FIG. 1 with exceptions which will be described below. Portions of the circuit of FIG. 2 similar to those of FIG. 1 are designated by the same reference numerals to facilitate comparison. Since there is a known relationship between the NTSC horizontal sync and color burst frequency $f_{SC} = 455/2 f_H$ and both reference signals are readily available in the television studio, it may be preferable in some cases to phase-lock the VCO signal to the color burst instead of to the horizontal sync. The frequency of the color burst (subcarrier) is 227.5 times higher than that of the horizontal sync and therefore, the design of the second frequency divider 5 is simplified in the latter case. Also, the phase-locked loop becomes "tighter" and the output signal frequency from the VCO 3 is more accurately controlled. To achieve the above-indicated goals, in the circuit of FIG. 2 the color burst signal of a frequency $f_{SC}$ is utilized as an input signal of the phase comparator 6. The color burst signal on line 8 may be obtained by separation from the incoming composite color television signal on line 1 in a well-known manner, or it may be obtained from a station reference subcarrier generator (not shown). In either case, a known constant phase relationship must exist between the horizontal sync and color burst supplied to the circuitry in order to avoid generation of set signals which are ambiguous with respect to the VCO output.

Accordingly, a factor J of second frequency divider 5 is selected to provide an output signal frequency equal to $f_{SC}$ to enable phase comparison in comparator 6. Otherwise, the operation of the circuit of FIG. 2 is similar to that of FIG. 1. For better illustration and comparison of the operation of the circuit of FIG. 2 with that of FIG. 1, assume that the frequency of the clock signal generated by the VCO 3 of FIG. 2 is equal to 21.49 MHz, which frequency corresponds to $G \times f_H$ ≈ 1365 × $f_H$ or to six times the frequency of the NTSC color subcarrier signal. Consequently, the parameter J of the second frequency divider 5 will be selected equal to 6. At the output of the first frequency divider 7 we receive a sampling signal of 10.7 MHz corresponding to three times the color subcarrier frequency, that is the same sampling frequency as in the above-disclosed circuit of FIG. 1.

Vertical alignment of the samples at the output of the second frequency divider 7 of FIG. 2 is provided by applying the horizontal sync signal on line 15 to the set input of the divider 7 and by setting it responsive to a transition of the horizontal sync to the same predetermined state during each consecutive horizontal blanking period, similarly as it has been described with respect to the circuit of FIG. 1.

While the circuit of FIG. 2 utilizes phase locked horizontal sync and color burst reference signals as provided in all standard NTSC broadcast television signals, the exact phase relationship between these two signals is usually unspecified and may differ from station to station. Consequently, when utilizing the digital encoding circuit of the preferred embodiment of the invention shown in FIG. 2, the set pulse applied to frequency divider 7 may become ambiguous at a particular phase relationship between the horizontal sync and color burst, specifically when the set pulse coincides with the clock pulse from the VCO 3. There also exist color systems such as PAL in which the sync to subcarrier phase relationship changes by a very small amount (0.576° corresponding to 0.36 nanoseconds) per line, in which systems sampling signals derived from an integral multiple of the subcarrier could still provide sufficiently close vertical alignment for effective comb filtering, but for which the circuit of FIG. 2 would not be suitable because of the changing phase relationship. A preferred embodiment of the invention which avoids the above-mentioned problems is shown in FIG. 3 and will be now described. Utilization of the circuit of FIG. 3 is preferable when there is a known fixed frequency and unknown phase relationship between the horizontal sync and the color subcarrier, when it is desired to phase-lock the oscillator frequency to a higher frequency signal such as color subcarrier rather than to the horizontal sync and when the desired sampling frequency is a non-integral rational multiple of the horizontal sync frequency. The respective blocks designated 2, 3, 5, 6 and 7 in the diagram of FIG. 3 are similar to those designated by identical reference numerals in the previously described circuit of FIG. 2 and therefore, only departures therefrom will be described to avoid undue repetition. The output signal of VCO 3 is phase-locked to the subcarrier signal on line 8, similarly as in the circuit of FIG. 2 with the exception that the phase comparator 6 may operate at a frequency other than $f_{SC}$ due to the presence of frequency divider 42. In the circuit of FIG. 3 preset pulses on line 11 of a frequency $f_{PR}$ higher than the reciprocal of the horizontal blanking period and at the same time of a frequency equal to a submultiple of the sampling frequency $f_S$ are utilized to preset the output signal of the frequency divider 7 as it will become apparent from the description below.

In the embodiment of FIG. 3, the first frequency divider 7 is implemented by a preset table counter into which a preset state on line 12 is transferred when a preset pulse appears on line 11. The preset pulses on line 11 are derived from the VCO 3 output pulses and a second frequency divider 43. Consequently, the preset pulses on line 11 are unambiguous with respect to the VCO 3 clock signal. The frequency divider 43 divides by a factor CN, C being an integral number and N being the factor of frequency divider 7. Because the preset pulses occur at a submultiple of the sampling signal frequency they are not vertically aligned. Therefore, the preset state on line 12 must be updated on a line-to-line basis. In the circuit of FIG. 3 a control signal on line 13 at a horizontal line frequency $f_H$ is applied to a line counter 44 which changes its state at every incoming horizontal sync. The state of counter 44 represents the state to which counter 7 is preset and serves to compensate for line-to-line displacement of the preset pulses on line 11. Consequently, counter 44 is implemented as a modulo N counter, that is, it has N different output states available on data transfer line 12 which are applied to frequency divider 7 as will be described in more detail later. In FIG. 3 the respective blocks 5 and 42 represent frequency dividers by J and K, respectively, whose factors are selected to produce equal frequencies of the respective signals at the input of phase comparator 6 utilized in the phase-locked loop.

Now the circuit operation of the preferred embodiment of the invention shown in FIG. 3 will be described. For better understanding of the circuit operation, in the following description time periods of signals rather than frequencies are considered where $T_H$ is the horizontal line period, $T_S$ the sampling signal period, $T_O$ the VCO 3 output signal period and $T_{PR}$ the period of the output signal of counter 43. Thus, the horizontal line period may be designated as:

$$T_H = (I + M/N) T_S \tag{1}$$

where I, N, M are integers. The VCO 3 output signal period is:

$$T_O = T_S/N \tag{2}$$

The period of the preset pulses at the output of counter 43 is:

$$T_{PR} = CNT_O = CT_S \tag{3}$$

The relative position of the preset pulses at the input of counter 7 with respect to the television raster or by other words, the time period of line-to-line misalignment of the preset pulses is given by:

$$\Delta T_{PR} = (T_H) \text{ MOD } T_{PR} \tag{4}$$

Consequently, to effect vertical alignment of the samples, the preset data on line 12 of the counter 7 must be set so as to compensate for the relative displacement of the preset pulses by $\Delta T_{PR}$ at the output of the counter 43 during each horizontal line. Let $\Delta S$ designate the number of states by which it is necessary to change the state of the counter 7 to compensate for $\Delta T_{PR}$ at the beginning of each horizontal line. The time period equal to $\Delta S$ states of the counter 7 is:

$$(\Delta S)(T_O) = [(T_H) \text{ MOD } T_{PR}] \text{ MOD } T_S \tag{5}$$

With respect to equation (3), the equation (5) simplifies to:

$$(\Delta S)(T_O) = (T_H) \text{ MOD } T_S \tag{6}$$

From equation (6) we obtain for the number of states:

$$\Delta S = (T_H) \text{ MOD } T_S/T_O \tag{7}$$

by which counter 7 has to advance at each subsequent horizontal line to obtain vertical alignment of sampling pulses at its output. This advance is realized by line counter 44, which is of the same modulus of counter 7, that is MOD N and is specifically designed to advance by $\Delta S$ states at the start of each horizontal line, using well known digital design procedures. As it follows from the foregoing description of the circuit shown in FIG. 3, the preset counter 7 at its output produces sample pulses of a frequency $f_S$ derived from the VCO 3 output pulses by dividing the frequency of the latter pulses by N. At occurrence of the first preset pulse on line 11 after occurrence of a horizontal sync pulse on line 13 the desired discontinuity corresponding to the preset state of counter 7 is produced in the sample pulses on line 45. Subsequent preset pulses on line 11 within the same horizontal line period have no further effect on discontinuity of sampling pulses because $T_{PR} = CT_S$ that is, the output pulses on line 45 are synchronous with the pulses on line 11 for the rest of the horizontal line period.

Since the frequency of the output pulses of counter 43 is lower than that of the clock pulses generated by VCO 3, it is desirable for counter 43 to produce narrow pulses of relatively short duration with respect to the clock pulses to ensure a proper presetting of divider 7. Alternatively, a conventional pulse former circuit (not shown) may be coupled to the output of counter 43 to obtain the desired narrow pulses.

To further illustrate the foregoing description of the operation of the circuit shown in FIG. 3, examples of circuits whose parameters are selected to obtain various desired sampling signal frequencies for encoding NTSC as well as PAL color television signals will be described now.

First, a circuit for forming sampling signals of a frequency equal to a 3.5 multiple of the NTSC subcarrier frequency will be described with reference to the foregoing disclosure. Thus, $$f_S = 3.5 f_{SC} \tag{8}$$

where $f_{SC}$ is the subcarrier signal frequency. With respect to the well known relationship:

$$f_{SC} = 455/2 f_H = 227.5 f_H \tag{9}$$

We may indicate:

$$f_S = (3.5 \times 227.5) f_H = 796 \tfrac{1}{4} f_H \tag{10}$$

or expressed in corresponding time periods:

$$T_H = 796 \tfrac{1}{4} T_S \tag{10a}$$

When comparing with expression (1) we obtain $I = 796$; $M = 1$; $N = 4$. Let $J = 14$; $K = 1$; that is, the phase comparator 6 operates at the subcarrier frequency. From the equation (2) we obtain for the VCO 3 output signal frequency:

$$f_O = Nf_S = (4 \times 3.5) f_{SC} = 14 f_{SC} = 3185 f_H \tag{11}$$

Let $C = 1$.
From equation (7) we obtain the number of counts by which the preset counter 7 must advance at the horizontal line rate:

$$\Delta S = \frac{(T_H) \text{MOD } T_S}{T_O} = \tag{2}$$

$$\frac{[(796\tfrac{1}{4})T_S]\text{MOD } T_S}{T_O} \quad 1 \text{ count/line}$$

The circuit having the foregoing parameters is shown as an example in a block diagram of FIG. 4. As above described, the preset pulses on line 11 are offset by ¼ of the sampling signal period with respect to the television raster. Consequently, the sampling pulses at the output of counter 7 would be offset by the same time period if not set at each horizontal sync. Since the preset counter 7 has 4 states per one full cycle of the sampling signal, it has to be advanced at each subsequent horizontal line by one count equal to one-quarter of a sampling signal period. Thus, the line counter 44 may be selected as a divider by 4 having four states and advanced by one state at each horizontal sync. The output signal of counter 44 is then applied as preset data on line 12 of counter 7 whose output pulses are in turn forced to advance by ¼ of the sampling signal period at each horizontal sync. Consequently, after the state of counter 44 has been changed by a horizontal sync occurring on line 13, that change appears on line 12 as a change in the preset state of counter 7. At the next incoming preset pulse on line 11 the output signal of counter 7 advances by one count equal to one quarter of the sampling signal cycle on line 45, thus effecting alignment of samples with respect to the television raster.

To illustrate utilization of the above-described circuit of FIG. 3 of the invention for sampling and digitally encoding PAL signals utilizing sampling signals having a frequency equal to 13/5 of the color subcarrier frequency the following example is given.

As it is well known in the art the following frequency relationship exists between PAL color subcarrier and horizontal sync frequencies:

$$f_{SC} = (283.75 f_H + 25) \text{ Hz} \tag{13}$$

However, in the following example we will neglect the 25 Hz line-to-line frequency increment and simplify the equation (13) for our purpose to:

$$f_{SC} \approx 283.75 f_H \tag{13'}$$

The 25 Hz frequency increment represents the above-described change in phase relationship between the horizontal sync and PAL subcarrier corresponding to 0.576° or 0.36 nanoseconds per line. This change however is well within the previously mentioned required tolerances for vertical alignment of samples of approximately 1 to 2 nanoseconds over a period of at least three consecutive lines and therefore the omission is permissible. Let a sampling frequency be:

$$f_S = 13/5 f_{SC} \approx 11.5 \text{ MHz} \tag{14}$$

Then:

$$f_S = (13/5 \times 283.75) f_H = 737 \tfrac{3}{4} f_H \tag{15}$$

and expressed in corresponding time periods:

$$T_H = 737 \tfrac{3}{4} T_S \tag{16}$$

Thus, with respect to equation (1) we obtain: $I = 737$; $M = 3$; $N = 4$. From equation (2) we obtain for the VCO 3 output signal frequency:

$$f_O = Nf_S = (4 \times 737 \tfrac{3}{4}) f_H = 2951 f_H = 52/5 f_{SC} \tag{17}$$

Let $J = 52$; $K = 5$, that is the phase comparator 6 operates at 1/5 of the subcarrier frequency. Let $C = 1$. From equation (7) we obtain the number of counts by which the preset counter 7 must advance at the horizontal line rate:

$$\Delta S = \frac{(T_H) \text{ MOD } T_S}{T_O} = \frac{[(737 \tfrac{3}{4}) T_S] \text{ MOD } T_S}{T_O} \tag{18}$$

$$= 3 \text{ counts/line}$$

A modulo 4 counter which advances by 3 states per clock pulse is equivalent to a counter which counts backwards by one state per line, or stated mathematically (3) MOD 4 = (−1) MOD 4. Hence, line counter 44 could be implemented as a conventional down counter whose states follow a descending sequence of numbers.

In another example of a preferred embodiment of the invention shown in FIG. 5, the sampling signal frequency is selected equal to three times the NTSC subcarrier signal frequency. FIG. 5 shows the parameters of the individual blocks selected to achieve the desired sampling frequency. As given above $$f_S = 3 f_{SC} \tag{19}$$

From equation (9) we obtain 682½

$$f_S = (682 \ 1/2) f_S \text{ and thus} \tag{20}$$

$$T_H = (682 + \tfrac{1}{2}) T_S \tag{21}$$

When comparing with expression (1) we obtain $$I = 682; M = 1; N = 2 \tag{22}$$

From equation (2) we obtain $$f_O = 2 f_S = 6 f_S \tag{23}$$

Let $J = 6$; $K = 1$, that is the phase comparator 6 operates at the subcarrier frequency. Let $c = 6$, that is, the parameter of the counter 43 is 12. From equation (7) we obtain the number of counts by which counter 7 has to advance at each subsequent horizontal line:

$$\Delta S = \frac{(T_H) \text{ MOD } T_S}{T_O} = \frac{(682 \tfrac{1}{2} T_S) \text{ MOD } T_S}{T_O} = 1 \text{ count/line} \tag{24}$$

In the block diagram shown in FIG. 5 the VCO 3 output signal frequency is equal to $6 f_{SC}$ and corresponds to 1365 $f_H$. Therefore, we obtain at the output of counter 43 a signal of one-half subcarrier signal frequency. The counter 7 is a divider by 2. In order to achieve vertical alignment of the sampling pulses, at the output of counter 46, it has to advance by one count at each incoming horizontal sync on line 13. Thus, to simplify the circuit, instead of employing a preset counter for the frequency divider 7 as in the previously described example, in the circuit of FIG. 5 a divide by 2 counter may be employed which has an independent set and rest input and a steering logic circuit 10. The counter 7 is alternately set and reset by pulses at one-half subcarrier frequency alternately applied by the steering logic circuit 10 via lines 11 and 12 in response to a control signal at one-half of horizontal sync frequency. The latter control signal is obtained from the incoming horizontal sync on line 13 by utilizing line counter 46 implemented as a divider by 2. The output signal of the divider 46 has a one-half horizontal line frequency and it is applied as a signal on line 47 to the steering logic circuit 10 schematically shown as a switch. At one polarity of the signal on line 47 the switch contacts line 11 and the pulses from the output of counter 43 are directed via the contact of switch 10 and line 11 to counter 7 as set pulses. At the opposite polarity of the signal on line 47 the switch is in its other position contacting line 12 and the pulses from 43 are directed to line 12 and applied to counter 7 as reset pulses. The respective signals on lines 11 and 12 are in phase with respect to each other but occur alternately on each respective line 11 or 12 during consecutive half-periods of the $f_{H/2}$ signal on line 47, that is, during consecutive horizontal line periods. Thus, the frequency divider 7 is set by a signal on one of the lines 11 or 12 at a one-half subcarrier signal frequency during one horizontal line period. During the next horizontal blanking interval, the signal on line 47 changes its phase and causes the steering logic circuit 10 to apply a reset signal to frequency divider 7 via the other one of lines 11 and 12. During the subsequent horizontal line period, the divider 7 is reset at one-half subcarrier signal frequency until the period on line 47 changes its phase again and the operation cycle repeats itself. The output signal of the frequency divider 7 is thus set by one-half of the sampling signal period when a set signal is applied and reset by the same period of time when applying a reset signal. Consequently, the sampling signal at the output of the frequency divider 7, which has a frequency of $f_S = 21.49$ MHz $\div 2 \approx 10.75$ MHz $\approx 682.5$ $f_H$ is repositioned by one-half period of the sampling signal by applying the set and reset output signals, respectively, from the control circuit 10, to frequency divider 7 during consecutive horizontal lines, thus achieving vertical alignment of samples on the television raster.

It is to be noted that the circuit of the invention will operate at any sampling frequency which is a non-integral rational multiple of the horizontal line frequency and can be expressed by the following notation as being an integral multiple plus a fraction of the horizontal line frequency of the analog television signal to be sampled:

$$f_S = (I + M/N)f_H$$

where $I, M, N$ are integers and $M<N$. For example, if the fraction is expressed as $M/N = 3/8$, the counter 44 would be designed as a modulo 8 counter which advances by 3 states at each incoming horizontal sync on line 13 and this count would be applied as preset state on line 12 to counter 7 at each incoming preset pulse on line 11. Thus, the preset data would advance by ⅜ of the sampling signal period at the horizontal line rate, thus achieving line-to-line vertical alignment of the sampling pulses.

The individual blocks of the preferred embodiments of the invention shown in FIGS. 1 to 5 may be implemented by conventional electronic devices. The set logic of the counter 7 shown in FIGS. 1 and 2, the preset logic shown in FIGS. 3 and 4, as well as the set and reset logic shown in FIG. 5, respectively is assumed to be included in the design of counter 7, but may be designed as a separate logic circuitry coupled to counter 7.

While the invention has been particularly shown and described with reference to preferred embodiments thereof, it will be understood by those skilled in the art that the foregoing and other changes in form and details may be made therein without departing from the spirit and scope of the invention.

I claim:

1. A circuit for digitally encoding by sampling an analog television signal having synchronizing components including a horizontal sync pulse, said signal having a known horizontal blanking period, comprising:

a means for generating a clock signal having a frequency equal to a first integral multiple of a desired frequency of a sampling signal and to a second integral multiple of a frequency of a synchronizing component of said analog television signal, said desired sampling signal frequency being a non-integral rational multiple of the frequency of the horizontal sync pulse;

a means coupled to a source of said synchronizing component and to said clock signal generating means for phase-locking said clock signal to said synchronizing component;

a first means coupled to said clock signal generating means for dividing the frequency of said clock signal by a factor equal to said first integral multiple for providing a sampling signal of said desired frequency, said first means coupled to a source of said horizontal sync pulse and being presettable during each horizontal blanking period to provide a sampling signal whose phase is the same as the beginning of each horizontal line of said television signal; and an analog-to-digital encoder coupled to receive both said analog television signal and said sampling signal for providing at an output a digitally encoded television signal.

2. The circuit of claim 1 wherein:

said clock signal generating means comprises a voltage-controlled oscillator whose frequency is equal to said second integral multiple of the horizontal sync frequency of said analog television signal;

said phase-locking means comprises means for comparing the phase of an output signal of said voltage-controlled oscillator to said horizontal sync pulse; and said first means comprises a presettable counter coupled to an output of said voltage-controlled oscillator and to a source of said horizontal sync pulse for setting said presettable counter during each horizontal blanking period.

3. The circuit of claim 1 for encoding an NTSC analog color television signal, said synchronizing components further including a color burst component having a known constant phase relationship to said horizontal sync pulse, wherein:

said clock signal generating means comprises a voltage-controlled oscillator whose frequency is equal to said second integral multiple of the NTSC color subcarrier frequency;

said phase-locking means comprises means for comparing the phase of an output signal of said voltage-controlled oscillator to a signal from a source of said color burst component; and said first means comprises a presettable counter coupled to an output of said voltage-controlled oscillator and to a source of said horizontal sync pulse for setting said presettable counter during each horizontal blanking period.

4. The circuit of claim 1 for digitally encoding an NTSC or PAL analog color television signal having a known fixed frequency relationship between the horizontal sync and color subcarrier components, wherein:

said clock signal generating means provides a clock signal of a frequency equal to said second integral multiple of said color subcarrier component frequency;

said phase-locking means comprises means for comparing the phase of said clock signal to said color subcarrier component of said analog television signal;

said first frequency dividing means comprises a presettable counter coupled to an output of said clock signal generating means; and wherein said circuit further comprises:

a second frequency diving means for providing preset pulses, said preset pulses being applied to said presettable counter, said second frequency dividing means coupled to said output of said clock signal generating means and dividing by a factor equal to a third multiple of the factor of said first frequency dividing means, the frequency of said preset pulses being greater than the reciprocal of the horizontal blanking period; and a line counter for receiving a control signal of the horizontal sync frequency and changing its output state in response thereto, said output state being applied as a preset state to said preset counter.

5. The circuit of claim 4 wherein said clock signal generating means comprises a voltage-controlled oscillator.

6. A circuit of claim 4 for digitally encoding an NTSC color analog televsion signal, providing a sampling signal having a frequency of three times the color subcarrier frequency, wherein:

said presettable counter comprises a first divide-by-two counter having an independent set input and an independent reset input and a steering logic circuit for applying said preset pulses to one of said independent inputs;

said second frequency dividing means comprises a divide-by-twelve counter providing said preset pulses at one-half color subcarrier frequency and having an output coupled to an input of said steering logic circuit;

said line counter comprises a second divide-by-two counter changing the polarity of its output state at one-half horizontal line frequency and having an output coupled to a steering input of said steering logic circuit; and said steering logic circuit applying said preset pulses to one of said independent set and reset inputs responsive to said polarity of the output state of said second divide-by-two counter; whereby said preset pulses are applied alternately to said set and reset input during consecutive horizontal lines of said NTSC color television signal.

7. A circuit for digitally encoding an analog television signal by sampling, comprising:

a voltage-controlled oscillator for generating a clock signal of a frequency equal to a first integral multiple of a desired sampling signal frequency and to a second integral multiple of the horizontal sync pulse frequency of said analog television signal, said desired sampling signal frequency being a non-integral rational multiple of said horizontal sync pulse frequency;

a phase-lock loop for phase-locking said clock signal to said horizontal sync pulse;

a presettable counter coupled to an output of said voltage-controlled oscillator for dividing the frequency of said clock signal by said first integral multiple to provide a sampling signal of said desired frequency, said presettable counter being set responsive to said horizontal sync pulse to the same state during each horizontal blanking period; and an analog-to-digital encoder receiving both said analog television signal and said sampling signal for digitally encoding said analog television signal.

8. A circuit for digitally encoding by sampling an NTSC analog color television signal having a known constant phase relationship between the color burst and horizontal sync components of said analog television signal, comprising:

a voltage-controlled oscillator for generating a clock signal of a frequency equal to a first integral multiple of a desired sampling signal frequency, a second integral multiple of the horizontal sync frequency and a third integral multiple of the NTSC color subcarrier frequency, said desired sampling signal frequency being a non-integral rational multiple of said horizontal sync frequency;

a phase-lock loop for phase-locking said clock signal to said color burst component;

a presettable counter coupled to an output of said voltage-controlled oscillator for dividing the frequency of said clock signal by said first integral multiple to provide a sampling signal of said desired frequency, said presettable counter being set responsive to said horizontal sync component to the same state during each horizontal blanking period; and an analog-to-digital encoder receiving both said analog television signal and said sampling signal for digitally encoding said analog television signal.

9. A circuit for digitally encoding by sampling an NTSC or PAL analog color television signal having a known fixed frequency relationship between the horizontal sync and color subcarrier components of said analog television signal, comprising:

means for generating a clock signal of a frequency equal to a first integral multiple of a desired sampling signal frequency, and a second integral multiple of said color subcarrier frequency, said desired sampling signal frequency being a non-integral rational multiple of said horizontal sync frequency;

means for phase-locking said clock signal to the color burst of the analog television signal;

a first presettable frequency dividing means coupled to an output of said clock signal generating means and dividing by a factor equal to said first integral multiple for providing a sampling signal of said desired frequency, said first frequency dividing means presettable to a preset state during each horizontal blanking period to provide a sampling signal having the same phase at the beginning of each horizontal line of the analog television signal;

a second frequency dividing means coupled to said output of said clock signal generating means and dividing by a factor equal to a third integral multiple of the factor of said first frequency dividing means for providing preset pulses applied to said first frequency dividing means, the frequency of said preset pulses being greater than the reciprocal of the horizontal blanking period; and a line counter for counting the horizontal lines of said analog television signal and changing its output state responsively by a predetermined number of states corresponding to said preset state, said output state being applied as said preset state to said first preset frequency dividing means.

10. The circuit of claim 9 wherein:

said means for generating a clock signal comprises a voltage-controlled oscillator;
said means for phase-locking is a phase-lock loop;
said first presettable frequency dividing means is a first presettable counter; and
said second frequency dividing means is a second counter.

* * * * *